United States Patent
Tachibana et al.

(10) Patent No.: US 7,182,981 B1
(45) Date of Patent: *Feb. 27, 2007

(54) CELLULOSE ESTER FILM AND PRODUCTION METHOD OF THE SAME

(75) Inventors: Noriki Tachibana, Hino (JP); Masahito Takada, Hino (JP); Yasuo Shimura, Hino (JP); Tadahiro Nagasawa, Hino (JP)

(73) Assignee: Konica Corporation, Tokyo (JP)

( * ) Notice: Subject to any disclaimer, the term of this patent is extended or adjusted under 35 U.S.C. 154(b) by 482 days.

This patent is subject to a terminal disclaimer.

(21) Appl. No.: 09/610,033

(22) Filed: Jul. 5, 2000

(30) Foreign Application Priority Data

Jul. 6, 1999 (JP) .................................. 11-191814

(51) Int. Cl.
*B32B 5/16* (2006.01)
*B32B 23/20* (2006.01)
*C09K 19/52* (2006.01)

(52) U.S. Cl. .................. 428/1.1; 428/1.3; 428/1.6; 428/323; 428/327; 428/329; 428/331; 428/409

(58) Field of Classification Search ................. 428/1.1, 428/1.6, 220, 323, 324, 325, 327, 328, 329, 428/330, 331, 332, 411.1, 500, 908.8; 359/483–502
See application file for complete search history.

(56) References Cited

U.S. PATENT DOCUMENTS

| | | | | |
|---|---|---|---|---|
| 4,861,803 A | * | 8/1989 | Turner | 521/37 |
| 5,554,287 A | * | 9/1996 | Beck et al. | 210/500.29 |
| 5,680,184 A | * | 10/1997 | Nishino | 349/78 |
| 5,855,660 A | * | 1/1999 | Bujard et al. | 106/418 |
| 6,106,926 A | * | 8/2000 | Kurz et al. | 428/141 |
| 6,320,042 B1 | * | 11/2001 | Michihata et al. | 536/69 |
| 6,436,538 B1 | * | 8/2002 | Takahashi et al. | 428/403 |
| 6,652,926 B1 | * | 11/2003 | Takada et al. | 428/1.2 |
| 6,828,006 B2 | * | 12/2004 | Takada et al. | 428/143 |

FOREIGN PATENT DOCUMENTS

| | | |
|---|---|---|
| JP | 4-152125 | 5/1992 |
| JP | 6-278149 | 10/1994 |

* cited by examiner

*Primary Examiner*—Monique R. Jackson
(74) *Attorney, Agent, or Firm*—Frishauf, Holtz, Goodman & Chick, P.C.

(57) ABSTRACT

To provide a cellulose ester film formed by casting, which minimizes degradation of optical properties as well as exhibits sufficient mechanical strength generated by the enhancement of tear strength, and further to provide a production method of the same.

A cellulose ester film characterized in comprising flat particles.

15 Claims, 1 Drawing Sheet

CELLULOSE ESTER FILM AND PRODUCTION METHOD OF THE SAME

FIELD OF THE INVENTION

The present invention relates to a cellulose ester film, and in more detail, to a protective film for a polarizing plate or an optical compensating film, in which optical properties as well as tear strength of the cellulose ester film itself, which is employed in a polarizing plate of a liquid crystal display, is enhanced.

BACKGROUND OF THE INVENTION

Cellulose triacetate film is transparent, has excellent physical and mechanical qualities, and exhibits minimal dimensional variation due to variation of temperature as well as humidity. Heretofore, it has been widely employed as a base for photographic film, drawing tracing film, electrical insulating materials and the like, and recently, has been employed as a protective film for a polarizing plate of liquid crystal displays or a support for optical compensating films. The cellulose triacetate film employed for the protective film for the polarizing plate of a liquid crystal display element is required to exhibit high light transmission, non-optical orientation, excellent adhesion to polarizing film, excellent flatness, high absorption of ultraviolet radiation, and the like. Further, when employed as the liquid crystal display installed in cars, demanded is excellent durability such as no degradation at high humidity as well as high temperature, excellent dimensional stability, and the like.

The aforementioned cellulose triacetate film exhibits excellent quality such as light transmission, non-optical orientation, and the like. However, since it does not absorb ultraviolet radiation, in order to minimize the degradation of the liquid crystal display due to ultraviolet radiation, UV absorbers are commonly incorporated into the cellulose triacetate film employed as a protective film for the polarizing plate, which is provided on the outermost surface of the liquid crystal display.

In more detail, in the cellulose ester film employed as the protective film for the liquid crystal, fine particles are incorporated to improve ultraviolet radiation resistance as well as conveyance properties. For instance, Japanese Patent Publication Open to Public Inspection No. 6-130226 describes a technique regarding incorporation of metal oxide particles having a diameter of not more than 0.2 µm; Japanese Patent Publication Open to Public Inspection No. 10-44327 describes a technique in which particles are applied onto cellulose ester film; and Japanese Patent Publication Open to Public Inspection No. 10-95862 describes a technique in which particles are incorporated and the transparency of the resulting cellulose ester is not degraded. In all of these, film is produced by casting dissolved cellulose ester.

SUMMARY OF THE INVENTION

Incidentally, in the casting, film shrinkage occurs through drying of solvents. By all means, problems occur in which the surface quality of the film is degraded. Thus a means to improve the surface quality is provided during drying or after drying. For example, Japanese Patent Publication Open to Public Inspection No. 4-152125 describes a technique in which drying is carried out while maintaining the width of the film, and Japanese Patent Publication Open to Public Inspection No. 6-278149 describes a technique in which treatment is carried out employing a heated roll as well as a cooled roll. Of these, the dimension retention drying technique exhibits marked improvement effects and is important. However, when a film containing particles is simply subjected to dimension retention drying, gaps form among the particles and the film, and other problems occur such as degradation of optical properties which increase haze on the film and decrease transmittance, as well as decrease tear strength of the film.

In view of the foregoing, the present invention has been accomplished. An object of the present invention is to provide a cellulose ester film formed by casting, which minimizes degradation of optical properties as well as exhibits sufficient mechanical strength generated by the enhancement of tear strength, and further to provide a production method of the same.

The invention and its embodiments are described below.

The cellulose ester film of the invention comprises particles having aspect ratio of 2 to 7.

The cellulose ester film wherein average particle diameter of the particles is preferably 0.2 to 10 µm.

The cellulose ester film wherein the particles are preferably secondary particles of primary particles having an average particle diameter of not more than 0.2 µm.

The cellulose ester film wherein the particles are preferably primary particles having an average particle diameter of 0.2 to 10 µm.

The cellulose ester film wherein the cellulose ester film comprises particles having average particle diameter of 0.2 to 10 µm, average particle diameter of the particles having aspect ratio of 2 to 7 is 0.2 to 10 µm, the particles having aspect ratio of 2 to 7 is contained not less than 5 wt % of whole particles having average diameter of 0.2 to 10 µm.

The cellulose ester film wherein a haze of the cellulose ester film is not more than 0.6 percent in terms of thickness of 80 µm.

The cellulose ester film wherein at least one side of a dynamic friction coefficient of the cellulose ester film is 0.3 to 1.5.

The cellulose ester film wherein tear strength of the cellulose ester film in terms of thickness of 80 µm is 18 g or more.

The cellulose ester film wherein the cellulose ester film contains 50 weight % or more of lower fatty acid ester of cellulose.

The cellulose ester film wherein the cellulose ester film is a film for the use of liquid crystal display.

The cellulose ester film wherein the cellulose ester film is a protective film for polarizing plate or a optical compensating film.

The cellulose ester film wherein in-plane retardation R0 of the protective film for polarizing plate or the optical compensating film is not more than 20 nm.

A polarizing plate comprising a first protective film for polarizing plate, a polarizing element, and a second protective film for polarizing plate, wherein the first protective film or the second protective film comprises cellulose ester film, wherein the cellulose ester film comprises particles having aspect ratio of 2 to 7.

A liquid crystal display comprising a first polarizing plate, a liquid crystal cell, and a second polarizing plate provided at inner portion with respect to the first polarizing plate and the liquid crystal cell, wherein the first polarizing plate has a first polarizing element, a first protective film provided on a surface of the first polarizing element which surface is not faced to the liquid crystal cell, and a second protective film provided on a surface of the first polarizing element which surface is faced to the liquid crystal cell, the second polarizing plate has a second polarizing element, a third protective film provided on a surface of the second polarizing element which surface is faced to the liquid crystal cell, and a fourth protective film provided on a surface of the second polarizing element which surface is faced to the liquid crystal cell, wherein at least one of the first, second, third and fourth protective film comprises cellulose ester film, wherein the cellulose ester film comprises particles having aspect ratio of 2 to 7.

A method of preparation of cellulose ester film comprising the steps of, casting cellulose ester comprising particles on a support, heating the cellulose ester on the support, peeling the cellulose ester film from the support, and holding and drying the peeled cellulose ester film, wherein the cellulose ester film after holding and drying comprises particles having an aspect ratio of 2 to 7.

The method of preparation of cellulose ester film, wherein remaining solvent amount is 10 wt % or more when the cellulose ester film is peeled from the support.

The preferred embodiments above will now be described below.

1. A cellulose ester film characterized in comprising flat particles.

The aspect ratio of said flat particles is to be between 2 and 7.

The average particle diameter of said flat particles is to be between 0.2 and 10 μm.

Said flat particles are to be incorporated into the entire particles, having an average diameter of 0.2 to 10 μm in an amount of at least 5 percent by weight.

Said flat particles are to be secondary particles of particles having a primary particle diameter of not more than 0.2 μm.

2. A cellulose ester film produced through a process in which said film maintains its width dimension and is dried, characterized in comprising particles having an average particle diameter of 0.2 to 10 μm, and exhibiting a haze of not more than 0.6 percent in terms of thickens of 80 μm, and a dynamic friction coefficient of 0.3 to 1.5.

Preferred embodiments will be described below.

The tear strength of said cellulose ester film is to be at least 18 g in terms of thickness of 80 μm.

The main component of said cellulose ester film is to be lower fatty acid ester.

Said cellulose ester film is to be comprised of lower fatty acid cellulose ester, and is to be prepared by dissolving said ester in organic solvents through a process which is cooled at −100 to −10° C. and subsequently heated to 0 to 120° C., and by applying the resulting cellulose ester containing organic solvent solution onto either an endless belt or a drum support.

Said cellulose ester film is to be a protective film for a polarizing plate.

3. In a method for producing a cellulose ester film through a process in which cellulose ester comprising particles is cast onto a support and cellulose ester obtained by peeling from said support is dimensionally retain-dried, a production method of a cellulose ester film characterized in that the residual solvent amount during peeling from said support is at least 10 percent by weight.

The present invention is accomplished to overcome problems in which during casting of a film, optical properties as well as tear strength of said film are degraded by the formation of gaps between the particles and the film due to dimension retention drying of a film, comprising particles. The present inventors paid close attention to the particle shape and achieved the present invention through discovering the following. When small primary particles, having a diameter of no more than 0.2 μm, were employed, it is possible to deform secondary particles into a flat shape, which were formed during dimension retention drying, by controlling the casting speed during casting, the amount of residual solvent during peeling of the film, and the tension while casting the film. As a result, it is possible to minimize gaps between the particles and the film. Further, alternatively, when particles, having a particle diameter of 0.2 to 10 μm, are incorporated, it was discovered that the formation of gaps between particles and the film was minimized by incorporation of flat particles having a particle diameter of 0.2 to 10 μm. Specifically, it was discovered that when the ratio of the residual solvent was at least 10 percent by weight during peeling the film from the support, good results were obtained. Further, it was also discovered that even when particles having a particle diameter of 0.2 to 10 μm, which were not flat, were incorporated, gaps between particles and the film were minimized at an amount of residual solvent of at least 10 percent by weight while peeling of the film from the support.

DETAILED DESCRIPTION OF THE PRESENT INVENTION

Figure 1:
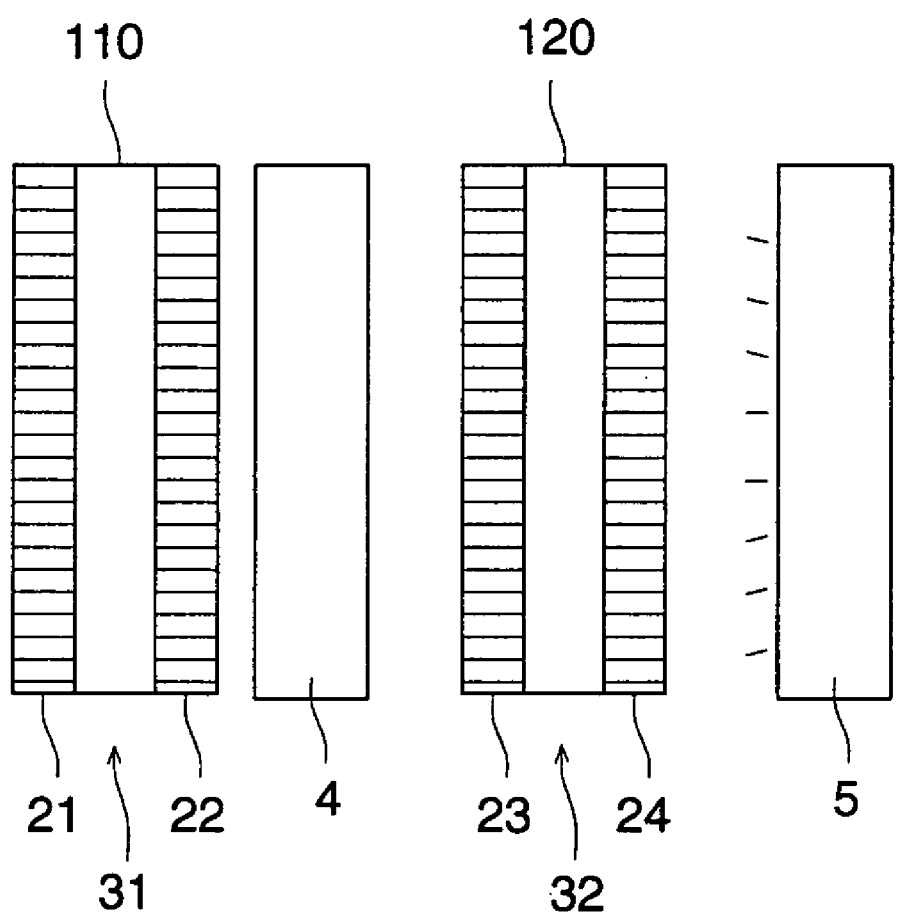
FIG. 1 is an example of a liquid crystal display of the present invention.

The cellulose ester film according to the invention comprises flat particles having aspect ratio of 2 to 7.

Listed as cellulose esters based on the present invention are cellulose triacetate, cellulose diacetate, cellulose acetate butyrate, cellulose acetate propionate, and the like. In the case of cellulose acetate, preferably is one having a particular degree of polymerization of 250 to 400 as well as a bonded acetic acid ratio of 54 to 62.5 percent. Cellulose triacetate having a bonded acetate acid ratio of 58 to 62.5 percent of cellulose triacetate is more preferred due to its higher base strength. Cellulose triacetate synthesized from cotton linter and one synthesized from wood pulp may be employed individually or in combination.

The cellulose acetate film preferably contains 50 weight % or more, further preferably 80 weight % or more of lower fatty acid ester of cellulose.

The larger amount of cellulose acetate synthesized from cotton linter, which exhibits better peeling properties from a belt-shaped support (for example, an endless belt), is preferably employed to obtain higher production efficiency. The content ratio of cellulose triacetate synthesized from cotton linter is preferably at least 60 percent by weight because peeling properties are markedly improved at a content ratio of at least 60 percent by weight. The content ratio is more preferably at least 85 percent by weight, and is most preferably 100 percent by weight.

Commonly, plasticizers are incorporated into cellulose triacetate film. Plasticizers, which may be employed in the present invention, are not particularly limited. However, preferably employed individually or in combination are phosphoric acid ester based plasticizers such as triphenyl phosphate, tricresyl phosphate, cresyldiphenyl phosphate, octyldiphenyl phosphate, diphenylbiphenyl phosphate, trioctyl phosphate, tributyl phosphate, and the like, phthalic acid ester based plasticizers such as diethyl phthalate, dimethoxyethyl phthalate, dimethyl phthalate, dioctyl phthalate, dibutyl phthalate, di-2-ethylhexyl phthalate, and the like, glycolic acid ester based plasticizers such as triacetin, tributyrin, butylphthalylbutyl glycolate, ethylphthalylethyl glycolate, methylphthalylethyl glycolate, butylphthalylbutyl glycolate, and the like. If desired, plasticizers may be employed in combination of two types or more. In this case, the ratio of phosphoric acid ester based plasticizers is preferably not more than 50 percent because in said ratio, cellulose ester film tends not to be subjected to hydrolysis resulting in excellent durability. A lower ratio of phosphoric acid ester based plasticizers is preferred. Either phthalic acid ester based or glycolic acid ester based plasticizers are preferably employed by themselves.

In the present invention, in order to maintain a water absorption ratio as well as a moisture ratio in the specified range, the added amount of plasticizers is preferably between 3 and 30 percent by weight with respect of cellulose ester, is more preferably between 10 and 25 percent by weight, and is further more preferably between 15 and 25 percent by weight. When the added amount exceeds 30 percent by weight, mechanical strength as well as dimensional stability tends to be degraded.

UV absorbers are preferably incorporated into the cellulose ester film of the present invention. Preferably employed are UV absorbers which are excellent in absorbing ultraviolet radiation having a wavelength of less than 370 nm to minimize degradation of the liquid crystal and absorb as little as possible visible light of wavelengths of more than 400 nm.

In the present invention, the transmittance at a wavelength of 370 nm is particularly to be not more than 10 percent, is preferably not more than 5 percent, and is more preferably not more than 2 percent.

Listed as compounds which are commonly employed are, for example, oxybenzophenone based compounds, benzotriazole based compounds, salicylic acid ester based compounds, benzophenone based compounds, cyanoacrylate based compounds, nickel complex salt based compounds, and the like. However, examples are not limited to these.

In the present invention, at least one of these UV absorbers is preferably employed, however more than two different UV absorbers may be incorporated in combination.

UV absorbers, which are preferably employed in the present invention, are benzotriazole based UV absorbers, benzophenone based UV absorbers, and the like. Embodiments, in which benzotriazole based UV absorbers with minimal coloration are incorporated into said cellulose triacetate film, are particularly preferred.

In addition thereto triazine based UV absorbers and polymer UV absorbers are employed preferably. Among these the UV absorbers having distribution coefficient of 10.1 or more is employed preferably.

Methods for adding UV absorbers are those in which UV absorbers are dissolved in organic solvents such as alcohol, methylene chloride, dioxolan, and the like, and then added to an organic solvent solution (hereinafter simply referred to as dope) of cellulose ester, or UV absorbers may be directly added to said dope. Inorganic powders, which are insoluble in organic said solvents are dispersed into organic solvents and cellulose ester employing a dissolver or a sand mill, and are then added to said dope.

The employed amount of UV absorbers in the present invention is commonly between 0.1 and 2.5 percent by weight with respect to the weight of cellulose ester, is preferably between 0.5 and 2.0 weight percent by weight, and is more preferably between 0.8 and 2.0 percent by weight. An amount of UV absorbers, exceeding 2.5 percent by weight, is not preferred due to the tendency of a decrease in transparency.

Employed as solvents for cellulose ester according to the present invention may be, for example, lower alcohols such as methanol, ethanol, n-propyl alcohol, iso-propyl alcohol, n-butanol, cyclohexanedioxanes, lower fatty acid hydrocarbon chlorides, and the like.

A preferred solvent ratio is, for example, 70 to 95 percent by weight of methylene chloride and 5 to 30 percent by weight of other solvents. Further, the concentration of cellulose ester is preferably between 10 and 50 percent by weight.

Production methods of cellulose ester film in the present invention are not particularly limited, and any of the several methods known in the art may be employed. For example, methods, which are described in the following, may be referred to: U.S. Pat. Nos. 2,492,978, 2,739,070, 2,739,069, 2,492,977, 2,336,310, 2,367,603, and 2,607,70 British Patent Nos. 64,071 and 735,892; Japanese Patent Publication Nos. 45-9074, 49-4554, 49-5614, 60-27562, 61-39890, and 62-4208; and others.

Necessary additives such as plasticizers, UV absorbers, and the like, other than cellulose ester and solvents, may be mixed in advance with a solvent and dissolved or dispersed and then placed into a solvent in which cellulose ester is not yet dissolved, or placed into a dope in which cellulose ester has been dissolved.

The heating temperature, after adding the solvent, is preferably higher than the boiling point at one atmospher of the employed solvent and the temperature at which said solvent does not boil. For example, the temperature is suitably set at least 60° C. and in the range of 80 to 110° C. Pressure is determined so that the solvent does not boil at the set temperature.

After dissolving cellulose ester, said ester may be removed from the vessel while cooling, or may be removed from the vessel employing a pump and cooled employing a heat exchanger and the like. The removed dope is then supplied for casting. At the time, cooling may be carried out to room temperature. However, cooling is preferably carried out to a temperature which is 5 to 10° C. lower than the boiling point of the employed solvent, and the cooled dope is employed for casting without varying the resulting temperature because it is possible to decrease the viscosity of the dope.

In the present invention, the best means to obtain cellulose ester film is as follows: a dope which is obtained by dissolving cellulose ester is cast onto a support (a casting process); is heated to remove some of the solvent (a drying process on the support); is peeled from the support; said peeled film is lead to a dimension retention drying process (a film dimension retention drying process); and heat-dried (a film drying process).

The support employed in the aforementioned casting process is comprised of stainless steel in either a belt shape or a drum shape, which is subjected to specular surface treatment. Casting may be carried out on the support in the common temperature range of 0° C. to less than the boiling point of the employed solvent. However, casting is preferably carried out on the support between 5 and 30° C., because the peel critical time may be increased by gelling the dope. The casting is more preferably carried out on the support between 5 and 15° C. The peel critical time as described herein means the time during which a cast dope stays on the support at the limit of a casting speed at which a transparent film with excellent flatness is continually obtained. The peel critical time is preferably as short as possible for excellent productivity to be obtained.

In the drying process, a dope is cast onto the aforementioned support and temporarily gelled. Thereafter, when time between the casting and the peeling is 100 percent, evaporation of solvents is enhanced by setting the dope temperature between 40 and 70° C. within 30 percent of time from the casting to peeling. As a result, peeling is carried out sooner. In order to further increase peeling strength, the dope temperature is preferably set between 55 and 70° C. within 30 percent. Said temperature is preferably maintained within at least 20 percent, and is more preferably maintained within at least 40 percent. Regarding drying on the support, peeling is preferably carried out in such a manner that the dope contains a residual solvent amount of 10 percent or more, and 60 to 150 percent is more preferable because peeling strength from the support decreases. The amount of residual solvent is more preferably between 80 and 120 percent.

When the dope is peeled, the temperature of said dope is preferably set between 0 and 30° C. because it is possible to increase the strength of the base, as well as to minimize the breakage of the same, and is more preferably set between 5 and 20° C.

In the present invention, the ratio of residual solvent in film formed on the support is expressed by the formula described below:

Ratio of residual solvent=(mass of residual volatile portion/mass of film after heating process)×100% wherein the mass of the residual volatile portion is a value obtained by subtracting the mass of film after the heating process from the mass of film prior to the heating process, when said film is subjected to a heating process at 115° C. for one hour.

In the film dimension retention drying process, the ratio of residual solvent is preferably at least 10 percent by weight while film dimension retention drying, is more preferably at least 15 percent by weight, and is most preferably at least 20 percent by weight. When primary particles having a diameter of 0.2 to 10 μm are not incorporated, the ratio of residual solvent is not limited. However, at least 5 percent by weight is preferred.

Commonly, in the film dimension retention drying process, methods are acceptable in which film is dried while

The invention claimed is:

1. A cellulose ester film comprising flat particles having aspect ratio of 2 to 7, wherein the aspect ratio is an average particle diameter/a thickness diameter of the particles and at least one side of the cellulose ester film has a dynamic friction coefficient of 0.3 to 1.5 wherein the dynamic friction coefficient is the dynamic friction measured in accordance with JIS-K-7125 (1987) between a facing material and a sliding material, wherein a front face of the cellulose ester film is the facing material and a reverse face of a second cellulose ester film of the same composition is the sliding material.

2. The cellulose ester film of claim 1 wherein average particle diameter of the particles having aspect ratio of 2 to 7 is 0.2 to 10 μm.

3. The cellulose ester film of claim 2 wherein the particles having aspect ratio of 2 to 7 are secondary particles of primary particles having an average particle diameter of not more than 0.2 μm.

4. The cellulose ester film of claim 2 wherein the particles having aspect ratio of 2 to 7 are primary particles having an average particle diameter of 0.2 to 10 μm.

5. The cellulose ester film of claim 1 wherein the cellulose ester film comprises particles having average particle diameter of 0.2 to 10 μm, average particle diameter of the particles having aspect ratio of 2 to 7 is 0.2 to 10 μm, the particles having aspect ratio of 2 to 7 is contained not less than 5 wt % of all particles having average diameter of 0.2 to 10 μm.

6. The cellulose ester film of claim 1 wherein a haze of the cellulose ester film is not more than 0.6 percent in terms of thickness of 80 μm.

7. The cellulose ester film of claim 1 wherein tear strength of the cellulose ester film in terms of thickness of 80 μm is 18 g or more.

8. The cellulose ester film of claim 1 wherein the cellulose ester film contains 50 weight % or more of lower fatty acid ester of cellulose.

9. The cellulose ester film of claim 1 wherein the cellulose ester film is a film for the use of liquid crystal display.

10. The cellulose ester film of claim 9 wherein the cellulose ester film is a protective film for polarizing plate or a optical compensating film.

11. The cellulose ester film of claim 10 wherein in-plane retardation R0 of the protective film for polarizing plate or the optical compensating film is not more than 20 nm.

12. The cellulose ester film of claim 1 wherein the particles are selected from the group consisting of silicon dioxide, titanium dioxide, aluminum oxide, and zirconium oxide.

13. The cellulose ester film of claim 12 wherein the particles are silicon dioxide.

14. A polarizing plate comprising a first protective film for polarizing plate, a polarizing element, and a second protective film for polarizing plate, wherein the first protective film and/or the second protective film comprises a cellulose ester film, wherein the cellulose ester film comprises particles having aspect ratio of 2 to 7 and at least one side of the cellulose ester film has a dynamic friction coefficient of 0.3 to 1.5 measured in accordance with JIS-K-7125 (1987) between a facing material and a sliding material, wherein a front face of the cellulose ester film is the facing material and a reserve face of a second cellulose ester film of the same composition is the sliding material.

15. A liquid crystal display comprising a first polarizing plate, a liquid crystal cell, and a second polarizing plate provided at inner portion with respect to the first polarizing plate and the liquid crystal cell, wherein the first polarizing plate has a first polarizing element, a first protective film provided on a surface of the first polarizing element which surface is not faced to the liquid crystal cell, and a second protective film provided on a surface of the first polarizing element which surface is not faced to the liquid crystal cell, the second polarizing plate has a second polarizing element, a third protective film provided on a surface of the second polarizing element which surface is faced to the liquid crystal cell, and a fourth protective film provided on a surface of the second polarizing element which surface is faced to the liquid crystal cell, wherein at least one of the first, second, third and fourth protective film comprises a cellulose ester film, wherein the cellulose ester film comprises particles having an aspect ratio of 2 to 7 and at least one side of the cellulose ester film has a dynamic friction coefficient of 0.3 to 1.5 measured in accordance with JIS-K-7125 (1987) between a facing material and a sliding material, wherein a front face of the cellulose ester film is the facing material and a reserve face of a second cellulose ester film of the same composition is the sliding material.

* * * * *